(12) United States Patent
Buchner et al.

(10) Patent No.: US 11,076,525 B2
(45) Date of Patent: Aug. 3, 2021

(54) SELF-PROPELLED SEED PLANTER

(71) Applicant: AGCO International GmbH, Neuhausen (CH)

(72) Inventors: Thiemo Buchner, Saal a.d. Donau (DE); Johannes Utz, Marktoberdorf (DE)

(73) Assignee: AGCO International GmbH, Neuhausen (CH)

( * ) Notice: Subject to any disclaimer, the term of this patent is extended or adjusted under 35 U.S.C. 154(b) by 236 days.

(21) Appl. No.: 16/335,106

(22) PCT Filed: Aug. 18, 2017

(86) PCT No.: PCT/EP2017/070933
§ 371 (c)(1),
(2) Date: Mar. 20, 2019

(87) PCT Pub. No.: WO2018/054626
PCT Pub. Date: Mar. 29, 2018

(65) Prior Publication Data
US 2019/0230845 A1 Aug. 1, 2019

(30) Foreign Application Priority Data
Sep. 22, 2016 (GB) ..................... 1616127

(51) Int. Cl.
*A01C 7/00* (2006.01)
*A01B 69/04* (2006.01)
*A01B 79/00* (2006.01)
*A01C 7/04* (2006.01)

(52) U.S. Cl.
CPC ............ *A01C 7/002* (2013.01); *A01B 69/008* (2013.01); *A01B 79/005* (2013.01); *A01C 7/04* (2013.01)

(58) Field of Classification Search
CPC .. A01C 7/002; A01C 7/00; A01C 7/04; A01B 79/005; A01B 79/00; A01B 69/007; A01B 69/00; A01B 69/008
See application file for complete search history.

(56) References Cited

U.S. PATENT DOCUMENTS

| | | |
|---|---|---|
| 3,982,661 A | 9/1976 | Feltrop |
| 4,061,094 A | 12/1977 | Cary et al. |
| 4,265,368 A | 5/1981 | Feltrop |
| 2016/0366814 A1 | 12/2016 | Roszman |

FOREIGN PATENT DOCUMENTS

| | | |
|---|---|---|
| EP | 2486781 A1 | 8/2012 |
| WO | 2012/115563 A1 | 8/2012 |
| WO | 2015/077452 A1 | 5/2015 |
| WO | 2016/087535 A1 | 6/2016 |
| WO | 2017/031415 A1 | 2/2017 |

OTHER PUBLICATIONS

European Patent Office, International Search Report for International Patent Application No. PCT/EP2017/070933, dated Nov. 7, 2017.
UK Intellectual Property Office, Search Report for Priority Application No. GB1616127.5, dated Mar. 23, 2017.

*Primary Examiner* — Christopher J. Novosad

(57) ABSTRACT

A self-propelled seeding vehicle includes a seed sorting and placement unit controlled by an on-board control system. The control system further controls a motive power unit operable to cause the vehicle to controllably traverse an area of ground to be seeded. The control system is further operable to control the sequential depositing of seeds independently of the speed of traversal of the ground by the vehicle.

11 Claims, 6 Drawing Sheets

FIG. 5
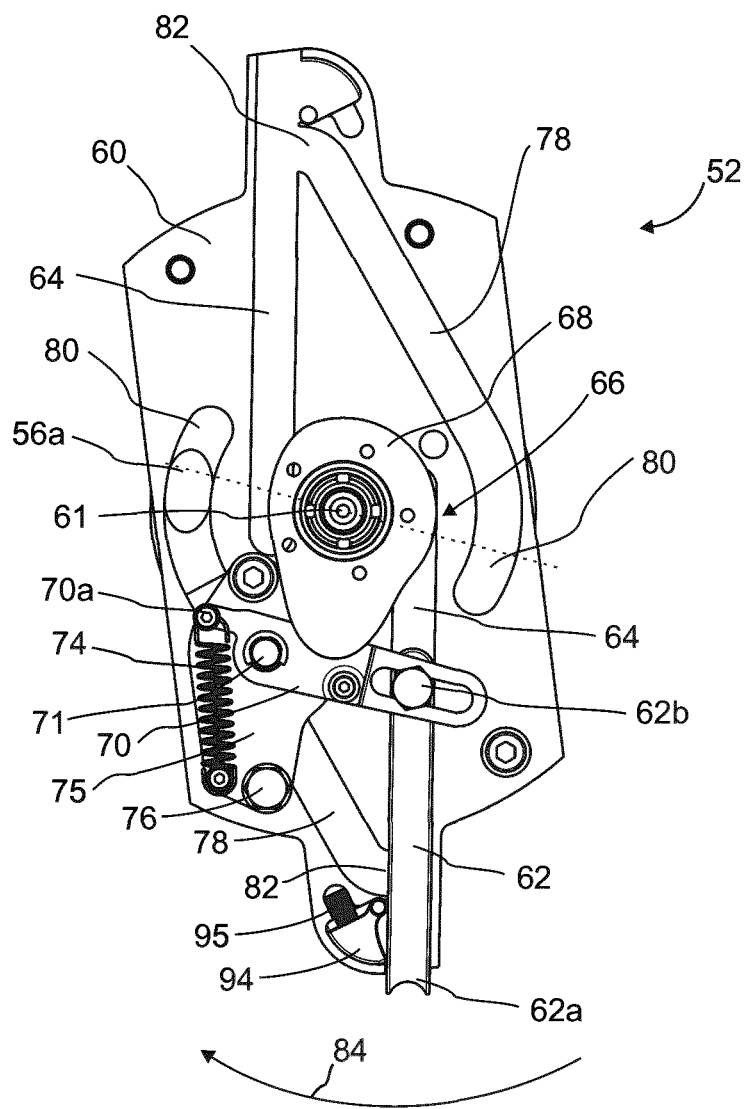
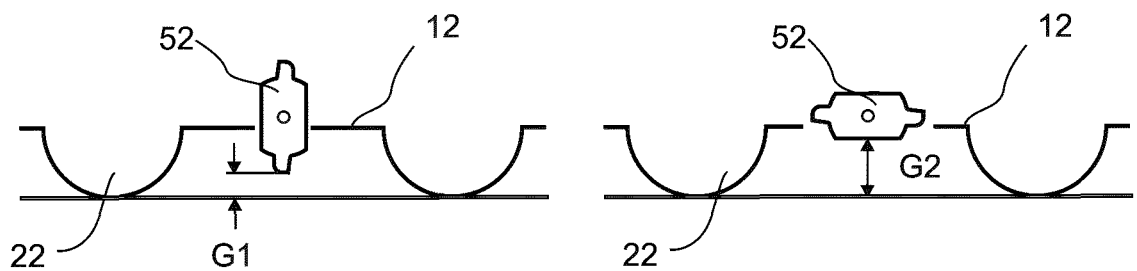
FIG. 6A
FIG. 6B

FIG. 7
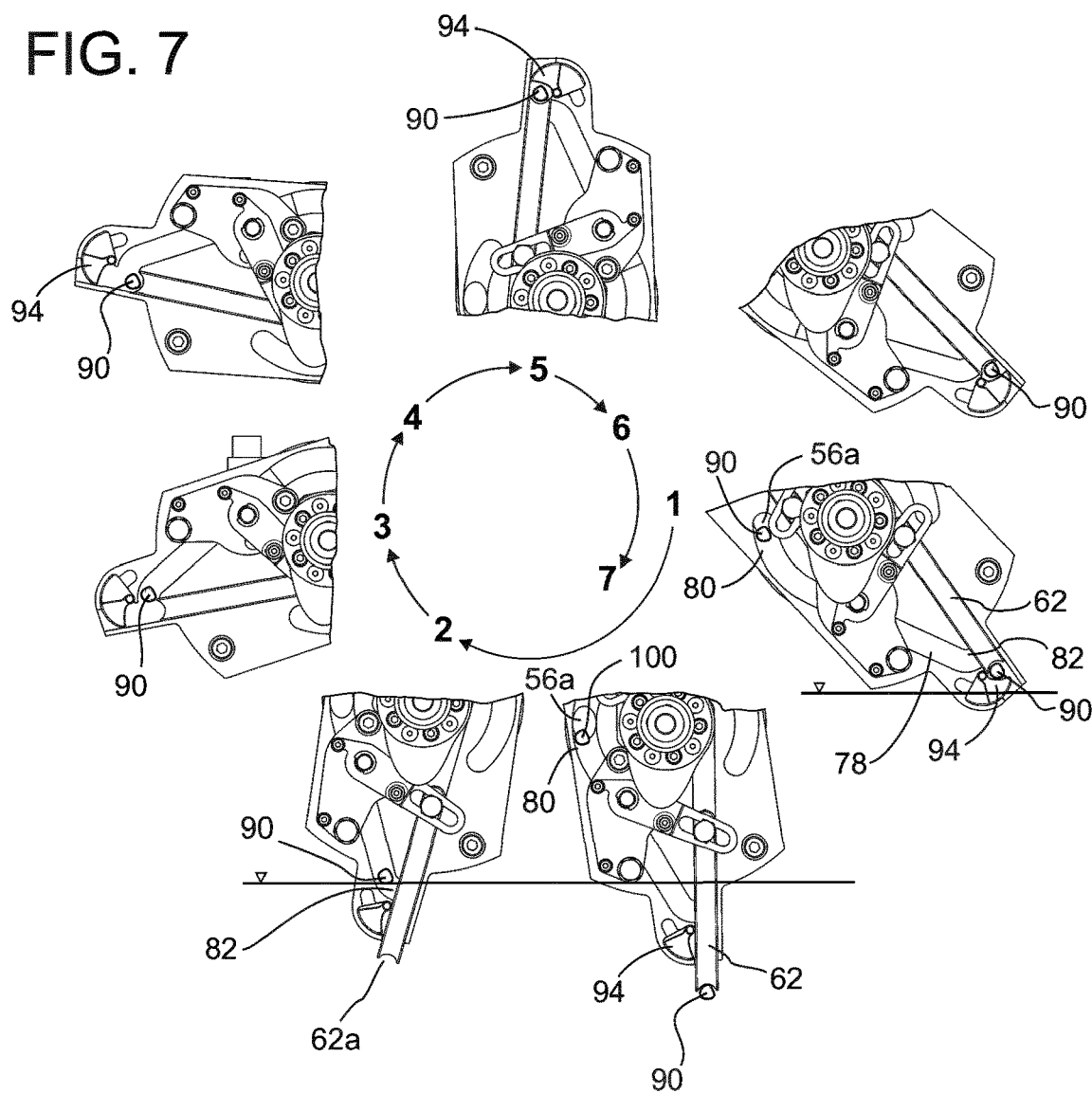
FIG. 8A
FIG. 8B
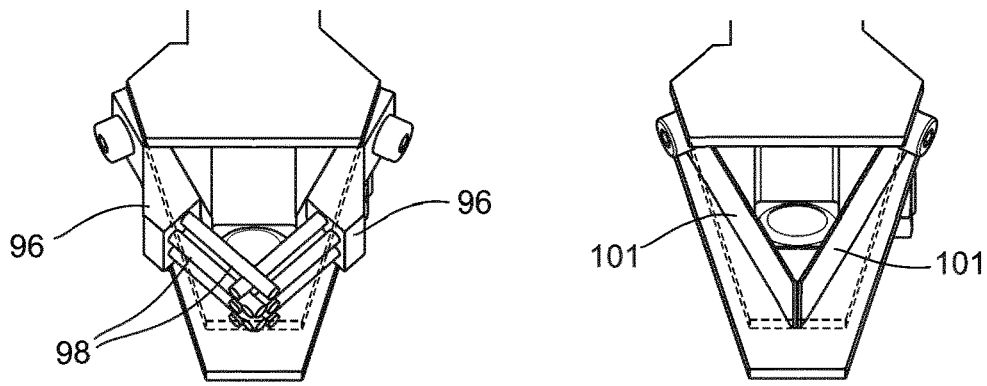

US 11,076,525 B2
SELF-PROPELLED SEED PLANTER

BACKGROUND OF THE INVENTION

Field of Invention

The invention is related to planters and particularly, although not exclusively, to those for use in automated agriculture systems comprising one or more driverless vehicles configured to perform the planting operation without direct intervention or control by an operator.

Description of Related Art

Ensuring food supply is the main challenge for the future of human life on planet earth. To reach for a sustainable and sufficient food supply current agricultural production systems and methods will need to go through radical changes. Arable land is limited: its effective, sustainable use is mandatory, especially as competition for use (Food, Feed, Fuel, Fiber) grows. High production costs provoke high food prices, especially critical for poor countries, and inaccurate use of seeds and agrochemicals results in high production costs and wasted resources.

Precision Farming (the accurate use of resources down to the plant as smallest individual unit) is a necessary measure to approach the mentioned challenges, but this is hard to achieve with large scale equipment (from a technical perspective as well as an economical perspective) and soil damage cannot substantially be reduced on heavy equipment due to the laws of growth (3D mass versus 2D contact area).

The answer to some of these issues is small automated driverless vehicles (robots), also known as autonomous agricultural machines (AAM's) able to operate around the clock without human surveillance. An example of such an automated agriculture system is described in the commonly-assigned International patent application WO2016/087535A1.

The conventional method of planting seeds (named drill seeding) involves using a disc, a plow or diverging blades to open a furrow, placing the seeds therein and using a closure device to cover the seeds with soil. This method is widely used in agricultural machine seeding. However, single seeding (precision planting) requires a considerable amount of drive power for furrow opening which is not generally available in an AAM.

A more suitable seeding method for an AAM is punch seeding, which is used for seeding of special crops under plastic sheeting or for hand seeders. One example of a punch seeder is described in United States patent U.S. Pat. No. 4,061,094 which comprises a slotted-rimmed wheel rotatably mounted on a frame with an axis of rotation passing through the center of a gear fixed to the frame. The wheel has a plurality of drive gears which communicate with and rotate around the fixed gear. On each drive gear is pivotally mounted a magnetic-tipped puncher. From a dispenser, individual seeds (coated with iron oxide) are placed on the end of the puncher. The rotation of the wheel causes the punchers to move in and out of the slots in the wheel. The action of the puncher produces a small hole in the soil and embeds a coated seed. Other examples, using cam discs and followers rather than gearing to reciprocate the punchers, are described in U.S. Pat. Nos. 3,982,661 and 4,265,368.

OVERVIEW OF THE INVENTION

In accordance with the present invention there is provided a self-propelled seeding vehicle comprising:

a control system and motive power unit operable to cause the vehicle to controllably traverse an area of ground to be seeded;

a seed tank;

a metering system configured to receive seeds from the seed tank and output them as a succession of individual seeds;

a seed placement unit coupled to receive individual seeds from the metering system and deposit them on the ground under control of the control system;

wherein the control system is operable to control the sequential depositing of seeds independently of the speed of traversal of the ground by the vehicle. Unlike the above-referenced prior art arrangements in which the operation of a punch seeding mechanism is mechanically linked to a ground traversal wheel, the control system of the present invention enables the planter to operate to position the controlled succession of individual seeds at specific (and generally pre-determined) locations, thereby reducing wastage.

The self-propelled seeding vehicle suitably includes a position determination system for the vehicle wherein the control system is operable to control the sequential depositing of seeds by reference to a predetermined deposit location for each seed and/or to record the deposit location for each seed. The control system may be operable to compare a recorded deposit location for a seed with a predetermined deposit location for that seed and, in the event of a mismatch, vary at least one of the vehicles speed across the ground and the operating speed of the seed placement unit such as to correct the mismatch for subsequent seeds.

Whilst various configurations of seed placement unit may be utilised, preferably, the seed placement unit is a punch seeding unit pivotably mounted to the vehicle and movable from an operating position, in which a cam-controlled puncher in a punch shaft extends downwardly from the vehicle, to a non-operating position in which the cam-controlled puncher in a punch shaft extends generally horizontally. With such a configuration, a body of the seed placement unit is preferably shaped as to give greater clearance between the unit and the ground when the unit is in the non-operating position compared to the operating position.

Where the seed placement unit (whether a punch seeder or otherwise) is positionally adjustable relative to the vehicle, and where the self-propelled seeding vehicle further comprises a position determination system for the vehicle, the control system may be operable to control the sequential depositing of seeds by moving the vehicle to a predetermined position received by said position determination system and adjusting the position of the seed placement unit and/or operable to record the deposit location for each seed by monitoring the position of the vehicle and the position of the seed placement unit.

In the self-propelled seeding vehicle, the seed placement unit may comprise a pair of cam-controlled punchers in respective parallel punch shafts.

The seed placement unit of the vehicle may suitably comprise:

a body;

an elongate puncher stamp having front and rear ends and being slidably received in a punch shaft formed in the body, which shaft is open at one end thereof;

a reciprocatory mechanism operable to produce reciprocatory movement of the puncher stamp in the punch shaft;

a seed channel formed in the body and extending from a first seed-entry end, open to the exterior of the body for the receipt of a seed for placement, to a second end intersecting the punch shaft within the body;

wherein the reciprocatory mechanism is operable to cause the puncher stamp to reciprocate between a deployed orientation in which the front end of the stamp protrudes outside of the body and a retracted orientation in which the front end of the stamp is withdrawn into the body beyond the intersection of punch shaft and seed channel such as to enable a seed to pass from the seed channel to the punch shaft.

In a seed placement unit as recited in the preceding paragraph, the reciprocatory mechanism may comprise:

a cam rotatably mounted relative to the body and having a predetermined cam profile;

a linkage pivotably attached at a first end to the body and at a second end to the rear end of the puncher stamp; and a cam follower rotatably attached to the linkage intermediate the first and second ends thereof and disposed to follow the cam profile as the cam rotates relative to the body causing the linkage to pivot back and forth about the attachment at its first end producing reciprocatory movement of the puncher stamp in the punch shaft. Alternately, the reciprocatory mechanism may comprise a cam rotatably mounted relative to the body and having a predetermined cam profile and a cam follower rotatably attached to the rear end of the puncher stamp and disposed to follow the cam profile as the cam rotates relative to the body producing reciprocatory movement of the puncher stamp in the punch shaft.

It will be understood that references herein to seed placement include seed planting, with the differentiation being whether or not the planter vehicle that deposits the seeds at a particular location also closes the soil over the deposited seed. A punch-seeder or punch-planter will generally push a deposited seed into the soil to some extent (depending on machine configuration and soil conditions) and enable soil to fall back into the deposit for closure afterwards. Alternatively, the punch-seeder may be provided with additional mechanisms for soil closure over a deposited seed, which additional mechanisms are outside of the scope of the present disclosure. References herein to seeding, planting, or seed placement will be understood to be interchangeable.

BRIEF DESCRIPTION OF THE DRAWINGS

Further features and advantages of the present invention will become apparent from reading the following description of embodiments of the invention, given by way of example only, with reference to the accompanying drawings in which:

FIG. 5 is a sectional schematic through the seed placement unit of FIG. 4;

FIGS. 6A and 6B respectively represent the orientation of the seed placement unit of FIG. 4 in operational and non-operational modes;

FIG. 7 represents the passage of a seed through the seed placement unit of FIG. 4 as the unit rotates;

FIGS. 8A and 8B show alternative configurations of closing element for a punch shaft in the seed placement unit of FIG. 4;

DETAILED DESCRIPTION OF THE INVENTION

While the disclosure will be described in connection with these drawings, there is no intent to limit it to the embodiment or embodiments disclosed herein. For instance, in the description that follows, the focus is on a self-propelled agricultural seeding machine embodied as an autonomous agricultural robot, though it should be appreciated that other embodiments of seeding machines are contemplated to be within the scope of the disclosure. Further, although the description identifies or describes specifics of one or more embodiments, such specifics are not necessarily part of every embodiment, nor are all various stated advantages necessarily associated with a single embodiment or all embodiments. On the contrary, the intent is to cover all alternatives, modifications and equivalents included within the scope of the disclosure as defined by the appended claims. Further, it should be appreciated in the context of the present disclosure that the claims are not necessarily limited to the particular embodiments set out in the description.

Figure 1:
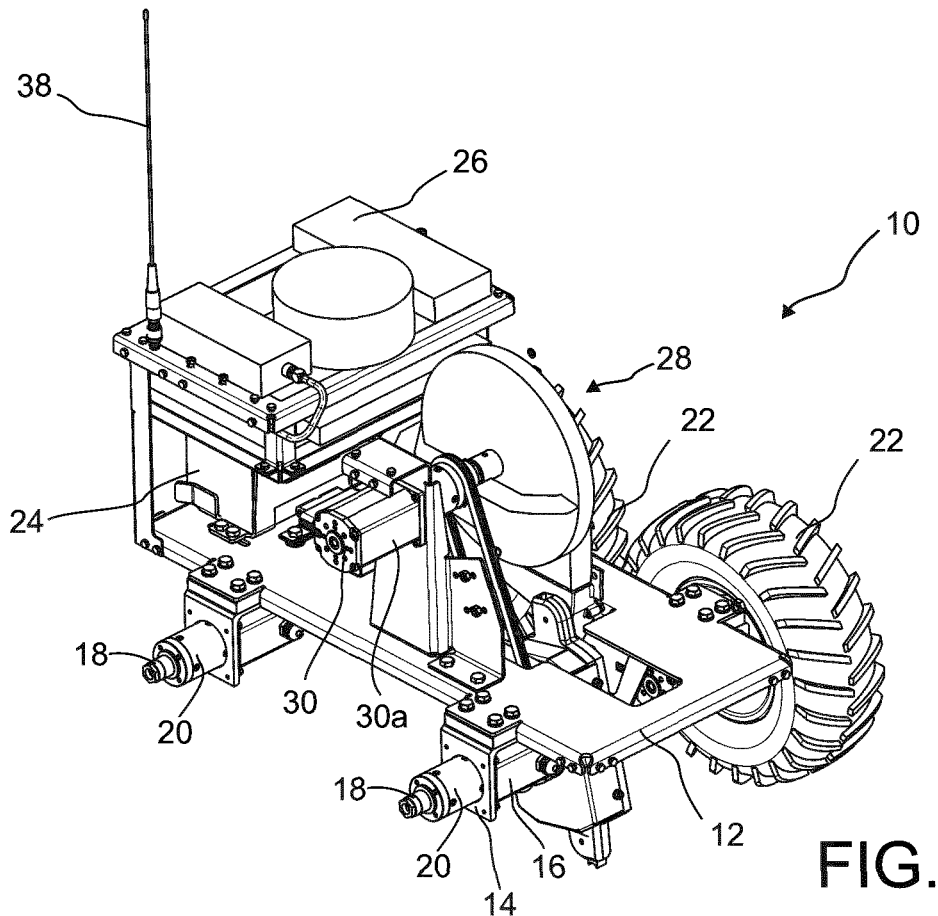
FIG. 1 is a perspective view of a self-propelled seeding vehicle.

FIG. 1 shows a vehicle in the form of an autonomous agricultural machine (AAM) 10 intended to be operated in clusters to perform an agricultural operation (in this case seeding/planting) on a field without direct operator control. The AAM's are self-propelled and have guidance and self-steering to enable them to traverse a field according to a predetermined path (which may be dynamically reassigned during operation by centralized or remote control) such that a cluster of AAM's cooperate to seed a field with individual seeds planted or deposited at predetermined locations.

The AAM 10 comprises a base-plate or chassis 12 to which are attached four support brackets 14, each mounting a respective drive motor 16, with each motor having an outwardly extending shaft to which are attached respective reduction gear units 20 providing output shafts 18 driving wheels 22 (two shown omitted for reasons of clarity). Motive power for the drive motors 16 is provided by a battery pack 24, with control of the drive to the individual drive motors 16 (including differential steering through control of the motor speed to each wheel) being handled by a drive/control and guidance system—indicated generally at 26 and described in further detail below with reference to FIG. 2.

Figure 2:
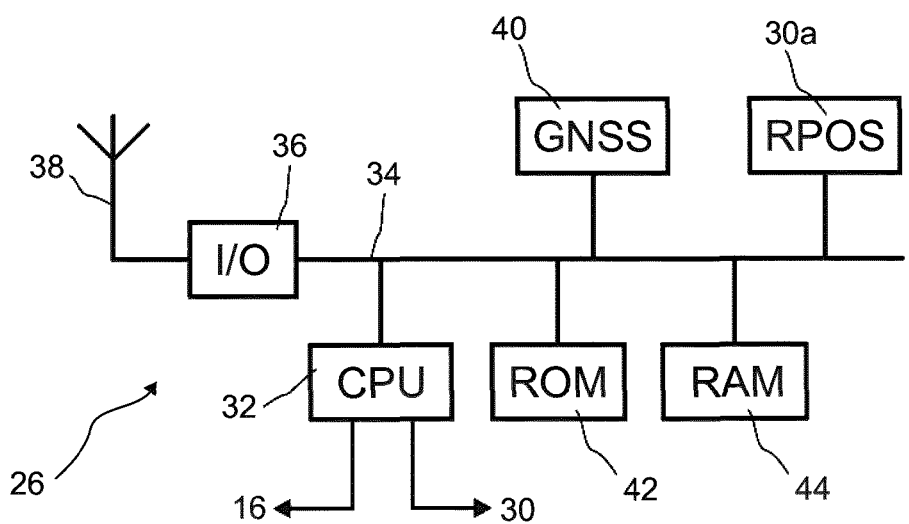
FIG. 2 schematically represents components of a control system for the vehicle of FIG. 1.

The AAM 10 further comprises a rotating punch-seeding seed sorting and placement unit, indicated generally at 28 and described in further detail below with reference to FIGS. 3 to 5. The seed sorting and placement unit 28 is mounted on the chassis 12 and operates through an aperture therein to deposit or plant seeds on or in the soil of a field traversed by the AAM under direction of the drive/control and guidance system 26 controlling a seeder motor 30 of the seed sorting and placement unit 28. Suitably the seeder motor 30 includes a rotary position sensor (30a; FIG. 2) such that the drive/control and guidance system 26 can stop the rotation of a seed placement unit 52 of the seed sorting and placement unit 28 with the seed placement unit 52 in one or more predetermined orientations, as discussed further below, as well as varying the speed of rotation.

The components of the drive/control and guidance system 26 are illustrated schematically in FIG. 2 and are based around a central processing unit (CPU) 32. The CPU 32 may be embodied as a custom-made or commercially available processor, an auxiliary processor among several processors (although simplicity in component numbers is desirable for an AAM), a semiconductor based microprocessor (in the form of a microchip), a macroprocessor, one or more application specific integrated circuits (ASICs), a plurality of suitably configured digital logic gates, and/or other well-known electrical configurations comprising discrete elements both individually and in various combinations to coordinate the overall operation of the drive/control and guidance system 26.

The CPU 32 is coupled via an address and data bus 34 to an I/O interface 36 to an aerial 38 which may provide one or more interfaces to a remote network or control system for a cluster of the AAM's. Additionally (although an additional aerial or antenna array may be used), this provides input for positioning data, for example Global Positioning System (GPS) or Global Navigation Satellite System (GNSS) data which is resolved in an on-board positioning system 40 to identify the current location of the AAM. With the rotary position sensor 30*a* detecting the orientation of the rotating seed placement unit 52 relative to the AAM at the instant of seed placement, the location of individual seeds is also determined.

Additionally coupled to the CPU 32 via bus 34 are onboard storage devices represented by read-only (ROM) and random-access (RAM) devices 42, 44. The ROM 42 suitably carries the boot-up and general operational software for the AAM (for example in terms of routines to be followed when deviation from a pre-planned path is necessitated by an encountered obstruction), whilst the RAM 44 captures transitory data such as the location of obstacles encountered (location determined by guidance/positioning system 40) and the actual location of seeds planted/deposited—for example where this departs from a pre-planned positioning due to environmental conditions and/or issues with the operation of the AAM (see also FIG. 9A-C and description below).

When certain embodiments of the drive/control and guidance system 26 are implemented at least in part as software (including firmware), it should be noted that alternatively or in addition to ROM 42, the software can be stored on a variety of non-transitory computer-readable medium for use by, or in connection with, a variety of computer-related systems or methods. In the context of this document, a computer-readable medium may comprise an electronic, magnetic, optical, or other physical device or apparatus that may contain or store a computer program (e.g., executable code or instructions) for use by or in connection with a computer-related system or method. The software may be embedded in a variety of computer-readable mediums for use by, or in connection with, an instruction execution system, apparatus, or device, such as a computer-based system, processor-containing system, or other system that can fetch the instructions from the instruction execution system, apparatus, or device and execute the instructions.

When certain embodiments of the drive/control and guidance system 26 are implemented at least in part as hardware, such functionality may be implemented with any or a combination of the following technologies, which are all well-known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

In addition to the above-mentioned capture of AAM positional data, the AAM may be provided with additional sensors to capture further operational machine information (e.g., tilt/yaw variations from horizontal, machine performance, battery usage etc.) which may be stored locally by the CPU 32 in memory 44 and made available by transmission via aerial 38 (if the device is configured also to transmit), or transferred via memory device, such as a memory stick, plugged into the AAM by the operator, or stored remotely and accessed, such as from a data structure (e.g., database) upon operator request or automatically upon detection of an event (e.g. conditions indicating failure of an individual AAM of a cluster).

Output from the CPU 32 provides a controlled drive signal to the four individual wheel drive motors 16, or such other drivetrain mechanism as the AAM may have (e.g. independently controllable tracks instead of wheels) as well as to the seeder motor 30 of the seed placement unit 28, as will be described in further detail below. It is important to note that, unlike with many previous configurations of punch seeder, the operation of the seed sorting and placement unit 28 is not mechanically linked to the drive motors 16 of the AAM, and accordingly the operation to place/plant a seed occurs purely on the basis of the instantaneous AAM (vehicle) location and the current position of the seed placement unit 28 as determined by rotary position sensor 30*a* of seeder motor 30 without reference to the degree of turn of the wheels (which may otherwise give wrong results in slippery conditions).

Figure 3:
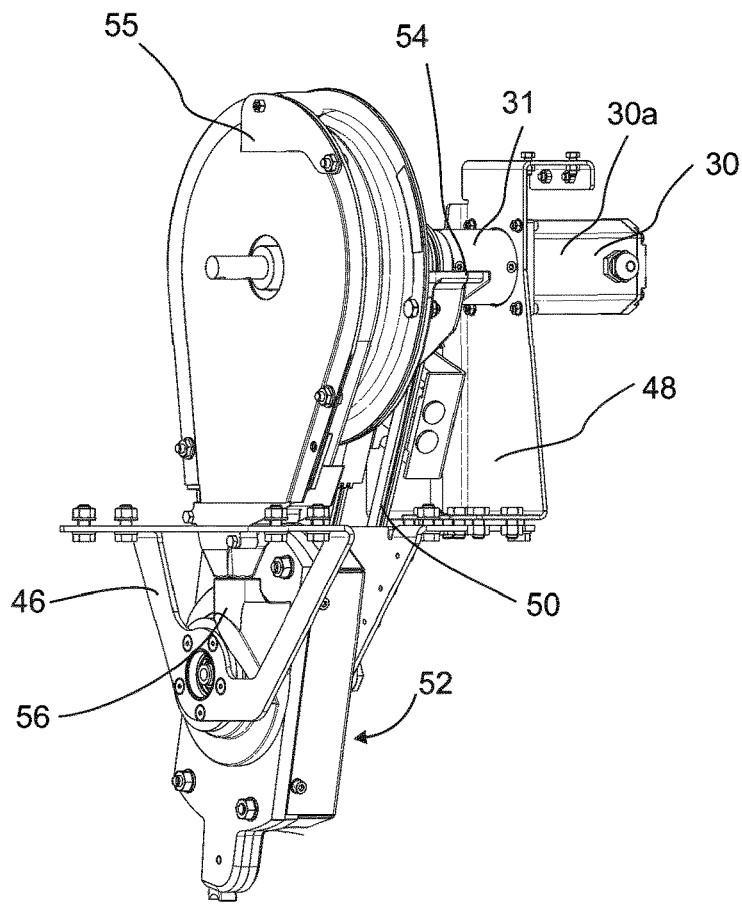
FIG. 3 is a perspective view of a seed sorting and planting assembly of the vehicle of FIG. 1.

FIG. 3 shows the main components of the seed sorting and placement unit 28, which is mounted to the chassis 12 of the AAM 10 by a pair of mounting brackets 46. Above the chassis, a mounting bracket 48 supports the drive seeder motor 30 which controllably rotates a sorting/singling unit 55 and, through a reduction gear 31 and pulley 33 and belt 50 arrangement, the seed placement unit 52 (described below).

A seed tank or reservoir 54 receives seeds to be planted or placed. As will be understood in the context of an AAM, replenishing the reservoir may be an autonomous activity triggered when the reservoir is low/empty, with the AAM leaving its current planned planting path to e.g. go to a host vehicle at the side of the field from which the reservoir may be replenished, before returning to the planned task.

Adjacent the reservoir 54, and coupled to receive seeds therefrom, is the sorting/singling unit 55 which takes seeds from the reservoir 54 and, in known fashion, separates them and outputs them as a sequence of individual seeds in a downward channel (transfer unit) 56, with individual seeds feeding into one of a pair of seed channels (described below) in the seed placement unit 52, when the seed placement unit 52 is at a particular predetermined point in its rotation.

Figure 4:
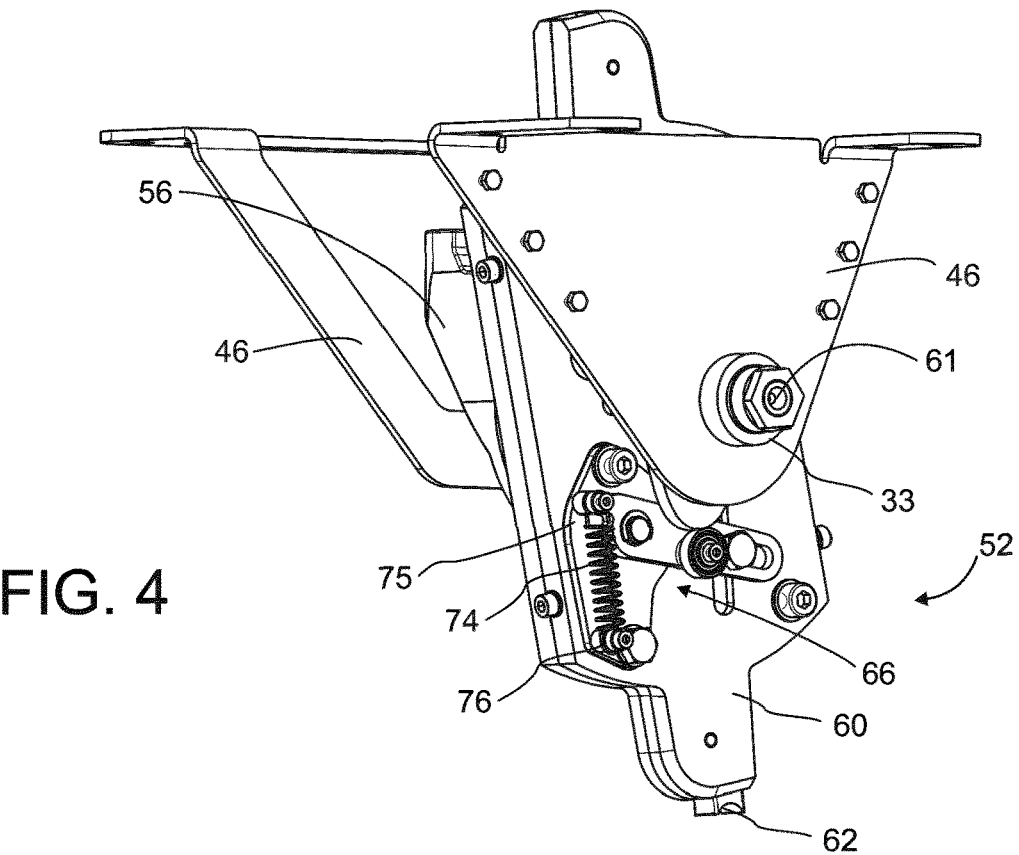
FIG. 4 is a perspective view of a punch-seeding seed placement unit of the assembly of FIG. 3.

The rotating seed placement unit 52 is shown in greater detail in the perspective view of FIG. 4 and the schematic sectional view of FIG. 5. Whilst the present invention encompasses a single-ended cam-driven punch-planter mechanism, a double-ended version is preferred, with two such mechanisms mounted end to end and rotating about a common axis and sharing a single control cam. FIG. 5 represents a double-ended version with some components omitted from the upper mechanism for clarity.

In a first embodiment, considering just the components of a single-ended mechanism, the punch-seeding seed placement unit 52 comprises a body or housing 60 rotatable by motor 30 about a central and generally horizontal axis 61.

An elongate puncher stamp 62 having front 62a and rear 62b ends is slidably received in a punch shaft 64 formed in the body 60. The shaft is open at the lower end thereof in the orientation of FIG. 5, such that the puncher stamp 62 can push downwardly out of the body 60 to either position a seed on the ground below the AAM, or drive it into the soil—depending on the extent of extension of the puncher stamp 62 and ground clearance of the AAM, as will be discussed below.

A reciprocatory mechanism indicated generally at 66 is operable to produce reciprocatory movement of the puncher stamp 62 in the punch shaft 64. In a preferred embodiment, the reciprocatory mechanism 66 comprises a cam 68 rotatably mounted relative to the body 60 and having a predetermined cam profile. Suitably, the cam 68 is fixedly attached (e.g. bolted) to one of the mounting brackets 46, with the body or housing 60 and remainder of the reciprocatory mechanism rotating relative thereto.

Suitably, the (or each) reciprocatory mechanism 66 includes a linkage 70 pivotably attached at or adjacent to a first end 70a (at rotary mount 71) to the body 60, and at a second end to the rear end 62b of the puncher stamp 62. The (or each) reciprocatory mechanism 66 further includes a cam follower 72 rotatably attached to the linkage 70 intermediate the first and second ends thereof and disposed to follow the cam profile as the cam 68 rotates relative to the body (thus causing the linkage 70 to pivot back and forth about the mounting 71 at or near its first end 70a producing reciprocatory movement of the puncher stamp 62 in the punch shaft 64).

As shown particularly in FIG. 4, the cam follower 72 may be biased to follow the profile of the cam 68 by a compression spring 74 linked to the first end 70a of the linkage 70 and at a second end to a detent 76 attached to the body 60. For constructional reasons, the pivotable attachment 70a of the first end of the linkage 70, and the detent to anchor one end of the biasing spring 74, may be moulded to the body 60 or (as shown) provided on a separate plate 75 attached thereto. Other arrangements are available to bias the cam follower 72 against the cam profile, for example including a tension spring extending from the first end 70a across the body 60, or a rotary spring arrangement around the linkage mounting at 71.

The usage of a linkage 70 to drivingly connect cam 68 and puncher stamp 62 provides the major advantages of producing a leverage so that the compact cam 68 provides relatively large movement of the stamp and avoids self-locking.

Within the body 60, an elongate seed channel 78 is formed. This extends from a first seed-entry end 80, open to the exterior of the body for the receipt of a seed for placement from an output 56a of seed transfer unit 56, to a second end 82 intersecting the punch shaft 64 within the body 60. Rotation of the unit will bring the entry 80 into line with the output 56a of the transfer unit 56 once per revolution of the body 60, although extending the entry 80 partially along a curved upper portion of the seed channel 78 will extend the window for transferring a seed from the transfer unit 56 (to e.g. 10-30 degrees of rotation of the unit 52) giving a degree of latitude to accommodate delays in the sorting/singling unit 55. By providing the curved upper portion as distant as possible from the rotational axis 61 of body 60 (or as close as possible to the outer contour of body 60), the window for seed transfer is further enlarged (as at a constant limiting angle, the arc length increases with radius).

The reciprocatory mechanism 66 causes the puncher stamp 62 to reciprocate between a deployed orientation (as shown in FIG. 5) in which the front end 62a of the stamp protrudes outside of the body 60, and a retracted orientation (as shown in FIG. 7, positions 3 and 4) in which the front end of the stamp is withdrawn into the body beyond the intersection 82 of punch shaft 64 and seed channel 78, such as to enable a seed to pass from the seed channel to the punch shaft.

As will be described in further detail below with particular reference to FIG. 7, it is a notable feature that the upper part of the seed channel 78 (in the arrangement shown in the mechanism in the lower part of FIG. 5) has the opening/first seed-entry end 80 to receive a seed from transfer unit 56 at the upper end of an arcuate portion, formed with the centre of curvature centred on the axis of rotation 61 of the unit. Given the clockwise nature of rotation of the unit 52 due to motor 30, belt 50 and pulley 33, (and as indicated by arrow 84 in FIG. 5), it will be recognized how the unit utilizes centrifugal force due to the rotation of unit 52 to impel a seed received at entry 80 towards the intersection 82 with the punch shaft 64. As a further benefit, it will be seen that introducing a seed via the opening 80 (at the left hand side of FIG. 5) when a double-ended unit is oriented with punchers generally up and down, allows gravity to assist centrifugal force in propelling a seed towards the punch shaft 64. By providing the curved upper portion as distant as possible from the rotational axis 61 of body 60, the effect of centrifugal forces is also enlarged.

As mentioned above, the arrangement of seeding placement unit 52 is optimized as a back to back (or end to end) arrangement of two cam-driven punch planters as described above. Reference to FIG. 5 will show how this is achieved with the addition of a further puncher 62 (in the upwardly extending punch shaft 64) with associated linkage 70 and cam follower 72, such that both units utilize the single cam 68 and operate 180 degrees out of sequence as the unit rotates.

A further benefit of the double-ended arrangement (as illustrated by FIG. 5), coupled with the control system 26 operating the planter mechanism independently of the motion (speed and/or position) of the AAM across the ground is that when the AAM is in a non-operational state, necessitating crossing the field to restock with seeds to the reservoir 54, the seed placement unit 52 may be turned to a generally horizontal orientation (with punchers 62 generally horizontal) such that the reduced width of unit 52 compared to the ends from which the punchers emerge) gives an improved ground clearance G2 compared to that G1 (between body 60 and/or punch end 62a and ground) when working and at least one of body 60 and/or punch end 62a is engaging ground, as shown in FIGS. 6A and 6B. Preferably G1 will be close to zero to minimize the necessary travel by the puncher 62 whilst avoiding contact between the body 60 and ground which may otherwise lead to the body 60 picking up an accumulation of soil and/or impeding movement of the AAM.

FIG. 7 is a sequence of drawings illustrating how a received seed 90 (from transfer unit 56) passes through the rotating placement unit 52. It will be noted that the full process from receipt to placement takes over 360 degrees (next seed is in before previous finally dispensed) so the image at position 7 will be understood to follow position 6, although shown between positions 1 and 2. It will also be recognized that the exact angular orientations of the unit 52 in each position are merely illustrative, are not limiting, and may change through e.g. the AAM travelling over rough or uneven terrain. It will be further recognized that references herein to "generally horizontal" and "generally vertical" encompass 0-30 degrees variance from absolute horizontal and vertical alignment.

Position 1: The seed 90 is introduced via seed entry 80 at the upper end of the seed channel 78. The unit is 30-45 degrees off vertical (in terms of the general alignment of the puch shaft). At this position, the seed punch 62 is partially extended to an intermediate position in which it blocks the path of a seed from the seed channel 78 to the punch shaft 64 but does not extend beyond the body 60. A closure element 94, in the form of a pivoted body biased to close the punch shaft by spring 95 (or alternately due to centrifugal force as the unit 52 rotates) and prevent escape of a seed therefrom, is in a closed position.

Position 2: The unit is in a generally vertical orientation, with the seed 90 having dropped through the seed channel 78 close to the intersection 82 with the punch shaft 64, due to both gravity and the centrifugal effect of the units clockwise rotation. The seed punch 62 is extended outwards from the body in a deployed orientation having just deposited a seed on the previous rotation. The seed punch 62 blocks the seed 90 from entering the punch shaft 64.

Position 3: As the unit moves upwards towards a horizontal orientation, the seed punch 62 has moved to a retracted location, inwardly in the body from the intersection 82 of seed channel 78 and punch shaft 64, allowing the seed 90 to drop into the punch shaft 64. Following withdrawal of the punch shaft 62, the closure element 94 has moved to the closed position.

Position 4: With the unit 52 continuing to rotate upwards, the seed 90 is in the punch shaft 64 and is impelled by the rotation to rest against the front edge of the seed punch 62, which is shaped or recessed to receive it.

Position 5: In a substantially vertical orientation of the unit 52, the seed punch 62 has been pushed outwards by the cam 68 to close off the intersection 82 of seed channel 78 and punch shaft 64. The seed 90 is held between the front edge 62a of the seed punch and the closure element 94.

Position 6: Through a turn of 90+ degrees (preferably 135 degrees), the profile of the cam 68 maintains the relative orientations of the seed 90, punch shaft 64, and closure element from Position 5.

Position 7: The high point of the cam 68 pushes the seed punch 62 to its maximum extension (outside the body) depositing and/or planting the seed 90 previously trapped between the front face 62a of the punch and the closure element 94. The front face 62a is so shaped that it (rather than the body of the seed 90) encounters and pushes open the closure element 94. At the same time, a new cycle has already started, with next seed 100 inserted at 80 and moving down the seed channel 78. The front face 62a of the seed punch 62 may suitably be dished (as shown) such that the edges will encounter and force open the closing element 94, or other shapes (for example a cut-back portion to receive the seed and a spike to move the closing element 94) are possible.

As shown in FIG. 7 the design of reciprocatory mechanism 66 provides major advantages:
1. During a wide range of rotation (>90°, in between Position 3 and prior to Position 5) the seed can pass from the second end/intersection 82 of seed channel 78 to the front face 62a of the seed punch 62 (or into punch shaft 64) so that the seed is safely transferred.
2. The seed punch 62 is closing the intersection 82 of seed channel 78 and punch shaft 64 prior to reaching the top dead center (shown with Position 5 in FIG. 7) so that the seed cannot fall back into seed channel 78.

3. The seed punch 62 and thereby the seed 90 is moving next towards closing element prior to engagement with the ground so that only a short stroke/movement within the punch shaft 64 and into the ground is necessary. In combination with the shape of the front face 62a, this reduces the risk of seed being withdrawn of the front face 62a during stroke/movement which may cause seed injury or puncher shaft blockages.

Although shown as a spring-biased body, closure element 94 may be a weighted body that swings closed solely under the effect of centrifugal force as the unit 52 rotates. Furthermore it will be appreciated that other forms of closure element 94 are possible. As shown in FIG. 8A, the closing element may comprise one or more brush elements 96 having resiliently deformable bristles 98 extending across the open end of the punch shaft. In a further alternative, shown in FIG. 8B, the closing element may comprise one or more deformable leaf springs 99 mounted to the body 60 extending across at least a part of the open end of the punch shaft. Leaf springs 99 may be made of spring steel or any deformable material such as plastics or rubber providing the demanded flexibility and wear resistance. Both embodiments shown in FIGS. 8A and 8B may have the advantage that soil getting stuck at the front face 62a of the seed punch 62 is peeled off before the seed punch 62 is retracted into the interior of body 60. Thereby the buildup of dirt/soil within punch shaft 64 is prohibited ensuring reliability. Other configurations of closing element are also contemplated.

Figure 9A:
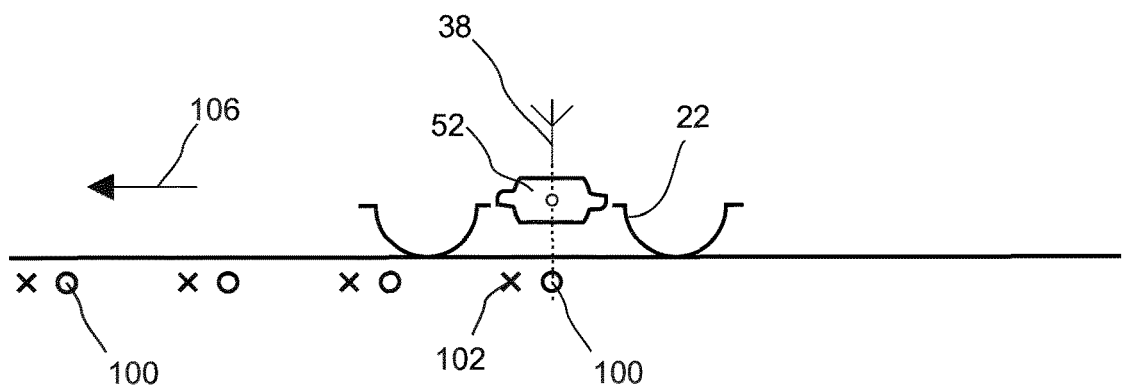
FIGS. 9A to C schematically represent aspects of the seeding process.
Figure 9B:
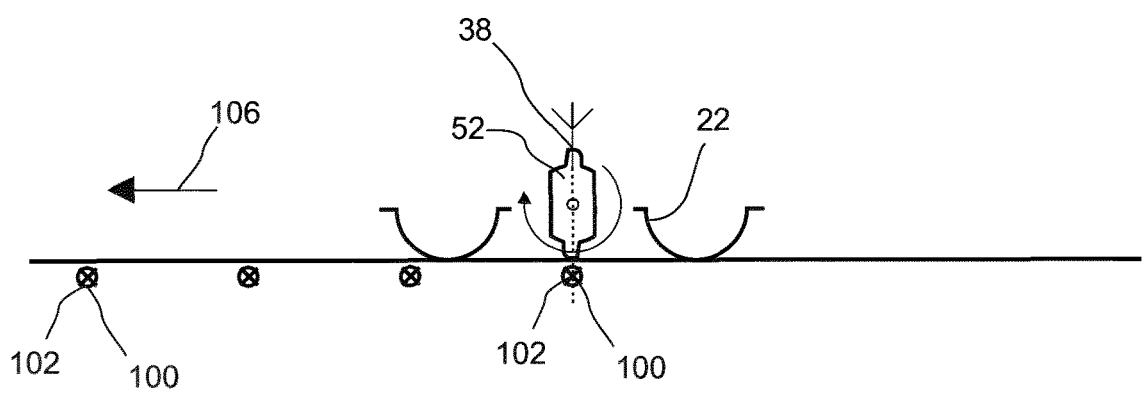
Figure 9C:
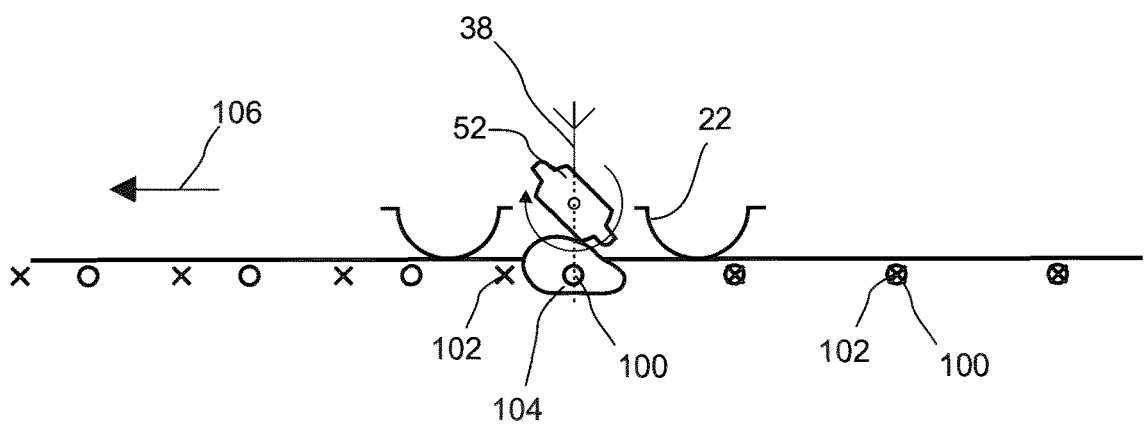

FIGS. 9A to C represent aspects of the seeding process, wherein the open circles 100 represent predetermined seed positions according to a seeding plan coming from a cloud-based planning system, such as that described in the above-referenced commonly-assigned International patent application WO2016/087535A1. In the figures, crosses 102 represent the actual location of a planted seed which, as mentioned above, may be derived from GPS/GNSS position determination for the AAM together with input from the rotary position sensor 30A indicating orientation of the seed placement unit 52 relative to the AAM. Arrow 106 indicates the direction of travel of the AAM.

The seeding plan provides the AAM with the information identifying the GPS coordinate at which the seed has to be placed. In FIG. 9A, the orientation of the seed placement unit 52 relative to the AAM is not considered, so that at the planned GPS position for the AAM, the seed placement unit 52 may not be in its seeding position (vertical). As a consequence, by the time the unit 52 has rotated into position to plant, the seeds would be positionally offset from the plan. In row seeding, this may not be that bad, but in precision seeding with special seed patterns or when the plants are treated individually afterwards, this offset is relevant as a following precision weed control application (applying pesticides around the planned seed position) would hit the crop also.

It will be understood that, although the schematics of FIG. 9A-C show the antenna 38 as aligned with the centre of rotation of the seed placement unit 52, there will generally be an offset (as in FIG. 1) which is taken into account in the control system when identifying an actual planting position.

In FIG. 9B the control system considers the position of seed placement unit 52, resulting in the seeds being placed according to the seeding plan (intended and actual positions 100/102 coincident) because the control system makes sure that at the demanded GPS planting position (relayed to the vehicle), the seed placement unit 52 is in seeding position.

In FIG. 9C a further situation is shown in which an obstacle is encountered. Initially (to the right in the figure)

the AAM is operating as in FIG. 9B with intended and actual planting positions 100/102 coincident. At a planned planting location, the seed placement unit 52 is blocked by a stone 104. This blockage results in a rotational offset. As a consequence, the subsequent seeds would be placed different to the seed plan, as shown to the left of the Figure and as in FIG. 9A.

Considering the information of the seed placement rotation sensor 30*a*, the control system would detect the rotation offset and may react by a correction to return to the seed plan by one or both of:

1. Increase/decrease speed of the placement unit 52
2. Increase/decrease speed across ground of the AAM As a result, the plan and placement would be re-aligned, as in FIG. 9B. This arrangement has the further benefit of enabling the independent seed drive to change seed patterns during movement, e.g. to alter planting spacing in motion without having to be stopped and reset.

In some circumstances, the control may have priority on constant speed of the system and just detect the deviation and forward this information to the cloud-based planning system so that following processes (such as weed control) are based on the correct (recorded actual) seed position.

In the foregoing the applicants have described a self-propelled seeding vehicle 10 which includes a seed sorting and placement unit 28 controlled by an on-board control system 26. The control system 26 further controls a motive power unit 24, 16 operable to cause the vehicle to controllably traverse an area of ground to be seeded. The control system 26 is further operable to control the sequential depositing of seeds independently of the speed of traversal of the ground by the vehicle.

Figure 10:
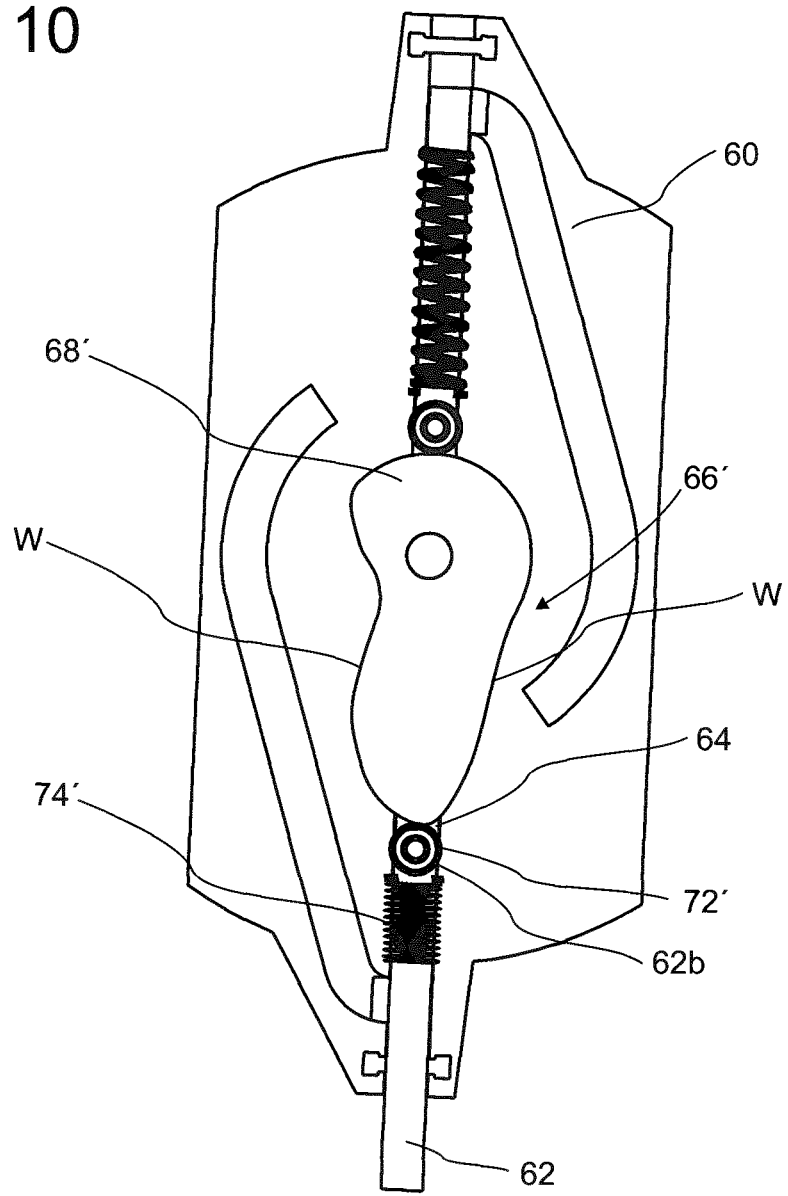
FIG. 10 is a sectional schematic through a further embodiment of seed placement unit.

FIG. 10 shows an alternative simplified reciprocatory mechanism 66' (in comparison to the above described reciprocatory mechanism 66) which may be provided by directly using a cam 68' to produce reciprocatory movement of the puncher stamp 62 in the punch shaft 64. Therefore, a cam follower 72' is attached the rear end 62*b* of the puncher stamp 62 to follow the cam profile as the cam 68 rotates relative to the body. The cam follower 72' may be biased to follow the profile of the cam 68' by a compression spring 74' linked to rear end 62*b* of the puncher stamp 62 and body 60. This solution is less preferred as the direct connection requires a larger cam dimensions (impacting ground clearance as described in FIGS. 6A and 6B) and the cam profile may have a tendency to self-locking due to low angle between cam profile tangent and direction of movement of the stamp (especially in the areas marked with W in the Figure).

From reading the present disclosure, other modifications will be apparent to persons skilled in the art. Such modifications may involve other configurations of seed placement unit or other features which are already known in the field of agricultural machines and component parts thereof and which may be used instead of or in addition to features already described herein, and the scope of the invention is limited only by the following claims.

The invention claimed is:

1. A self-propelled seeding vehicle comprising:
   a control system and motive power unit operable to cause the vehicle to controllably traverse an area of ground to be seeded;
   a seed tank;
   a metering system configured to receive seeds from the seed tank and output a succession of individual seeds;
   a seed placement unit coupled to receive the individual seeds from the metering system and sequentially deposit the individual seeds on the ground under control of the control system; and
   a position determination system;
   wherein the control system is operable to control the depositing of seeds independently of a ground speed of the vehicle; and
   wherein the control system is operable to compare a recorded deposit location for a seed with a predetermined deposit location for that seed and, in the event of a mismatch, vary at least one of the ground speed of the vehicle and an operating speed of the seed placement unit to correct the mismatch for subsequently deposited seeds.

2. The self-propelled seeding vehicle of claim 1, wherein the control system is operable to control the depositing of seeds by reference to a predetermined deposit location for each seed.

3. The self-propelled seeding vehicle of claim 1, wherein the seed placement unit comprises a punch seeding seed placement unit.

4. The self-propelled seeding vehicle of claim 3, wherein the seed placement unit comprises a pair of cam-controlled punchers in respective parallel punch shafts.

5. The self-propelled seeding vehicle of claim 3, wherein the seed placement unit comprises:
   a body defining a punch shaft and a seed channel therein, wherein the punch shaft is open at one end, and wherein the seed channel has a first seed-entry end that is open to an exterior of the body for the receipt of a seed, and a second end within the body and intersecting the punch shaft;
   an elongate puncher stamp having front and rear ends and being slidably received in the punch shaft; and
   a reciprocating mechanism operable to produce reciprocating movement of the puncher stamp in the punch shaft;
   wherein the reciprocating mechanism is operable to cause the puncher stamp to reciprocate between a deployed orientation in which the front end of the stamp protrudes outside of the body and a retracted orientation in which the front end of the stamp is withdrawn into the body beyond the intersection of punch shaft and seed channel to enable a seed to pass from the seed channel to the punch shaft.

6. The self-propelled seeding vehicle of claim 5, wherein the reciprocating mechanism comprises:
   a cam rotatably mounted relative to the body and having a cam profile;
   a linkage pivotably attached at a first end to the body and at a second end to the rear end of the puncher stamp; and
   a cam follower rotatably attached to the linkage intermediate the first and second ends of the linkage and disposed to follow the cam profile as the cam rotates relative to the body, causing the linkage to pivot back and forth about the attachment at the first end of the cam follower, producing reciprocating movement of the puncher stamp in the punch shaft.

7. The self-propelled seeding vehicle of claim 5, wherein the reciprocating mechanism comprises:
   a cam rotatably mounted relative to the body and having a cam profile; and
   a cam follower rotatably attached to the rear end of the puncher stamp and disposed to follow the cam profile as the cam rotates relative to the body, producing reciprocating movement of the puncher stamp in the punch shaft.

8. A self-propelled seeding vehicle comprising:

a control system and motive power unit operable to cause the vehicle to controllably traverse an area of ground to be seeded;

a seed tank;

a metering system configured to receive seeds from the seed tank and output a succession of individual seeds; and a seed placement unit coupled to receive the individual seeds from the metering system and sequentially deposit the individual seeds on the ground under control of the control system, the seed placement unit comprising a punch seeding seed placement unit pivotably mounted to the vehicle and movable from an operating position, in which a cam-controlled puncher in a punch shaft extends downwardly from the vehicle, to a non-operating position in which the cam-controlled puncher in the punch shaft extends generally horizontally;

wherein the control system is operable to control the depositing of seeds independently of a ground speed of the vehicle.

9. The self-propelled seeding vehicle of claim 8, wherein the seed placement unit is positionally adjustable relative to the vehicle, further comprising a position determination system, wherein the control system is operable to record the deposit location for each seed by monitoring the position of the vehicle and the position of the seed placement unit.

10. The self-propelled seeding vehicle of claim 8, wherein a body of the seed placement unit is shaped to provide greater clearance between the seed placement unit and the ground when the seed placement unit is in the non-operating position compared to the operating position.

11. A self-propelled seeding vehicle comprising:

a control system and motive power unit operable to cause the vehicle to controllably traverse an area of ground to be seeded;

a seed tank;

a metering system configured to receive seeds from the seed tank and output a succession of individual seeds;

a seed placement unit coupled to receive the individual seeds from the metering system and sequentially deposit the individual seeds on the ground under control of the control system, wherein the seed placement unit is positionally adjustable relative to the vehicle; and a position determination system;

wherein the control system is operable to control the depositing of seeds by moving the vehicle to a predetermined position and adjusting the position of the seed placement unit.

* * * * *